(12) United States Patent
Wegener

(10) Patent No.: US 11,064,055 B2
(45) Date of Patent: Jul. 13, 2021

(54) ACCELERATED DATA CENTER TRANSFERS

(71) Applicant: ANACODE LABS, INC., Watsonville, CA (US)

(72) Inventor: Albert W Wegener, Aptos Hills, CA (US)

(73) Assignee: ANACODE LABS, INC., Watsonville, CA (US)

( * ) Notice: Subject to any disclaimer, the term of this patent is extended or adjusted under 35 U.S.C. 154(b) by 0 days.

(21) Appl. No.: 16/828,509

(22) Filed: Mar. 24, 2020

(65) Prior Publication Data
US 2021/0029223 A1 Jan. 28, 2021

Related U.S. Application Data

(60) Provisional application No. 62/877,150, filed on Jul. 22, 2019.

(51) Int. Cl.
*H04L 29/06* (2006.01)
*H04L 29/08* (2006.01)

(52) U.S. Cl.
CPC .......... *H04L 69/04* (2013.01); *H04L 67/1097* (2013.01); *H04L 69/329* (2013.01)

(58) Field of Classification Search
CPC ... H04L 69/04; H04L 67/1097; H04L 69/329; H04L 47/2458; H04L 29/06
USPC ........................................................ 709/247
See application file for complete search history.

(56) References Cited

U.S. PATENT DOCUMENTS

| | | | |
|---|---|---|---|
| 9,859,918 B1 * | 1/2018 | Gopal | G06F 3/0653 |
| 10,073,971 B2 * | 9/2018 | Jain | G06F 21/53 |
| 2002/0065776 A1 * | 5/2002 | Calder | H04L 67/2842 |
| | | | 705/51 |
| 2003/0078935 A1 | 4/2003 | Zibin et al. | |
| 2004/0210763 A1 | 10/2004 | Jonas | |
| 2006/0173754 A1 * | 8/2006 | Burton | G06Q 30/0643 |
| | | | 705/26.62 |
| 2006/0235895 A1 | 10/2006 | Rodriguez et al. | |

(Continued)

FOREIGN PATENT DOCUMENTS

| | | |
|---|---|---|
| WO | 2014056458 A1 | 4/2014 |
| WO | 2015196126 A1 | 12/2015 |

(Continued)

OTHER PUBLICATIONS

Pane et at, "Making Better Use of Bandwidth: Data Compression and Network Management Technologies," Rand Arroyo Center, 2005, 56 pages.

(Continued)

*Primary Examiner* — Chirag R Patel
(74) *Attorney, Agent, or Firm* — Haynes Beffel & Wolfeld LLP

(57) ABSTRACT

A block-oriented lossless decompressor is used to decode encoded data fetched from storage that is subsequently transferred across a network in encoded (compressed) form. In examples described herein, applications executing at network nodes send GET requests, or similar messages, to storage systems, which can return compressed data this is decompressed in an intermediate node (between the storage node and the app), and can return compressed data that is decoded in the same network node in which the requesting application is running.

18 Claims, 12 Drawing Sheets

(56) References Cited

U.S. PATENT DOCUMENTS

| | | | |
|---|---|---|---|
| 2007/0008191 | A1 | 1/2007 | Archbold et al. |
| 2010/0324914 | A1 | 12/2010 | Stachurski et al. |
| 2011/0314070 | A1* | 12/2011 | Brown .................... G06F 16/16 707/827 |
| 2012/0045142 | A1 | 2/2012 | Demidov et al. |
| 2012/0057616 | A1 | 3/2012 | Padilla et al. |
| 2012/0089781 | A1 | 4/2012 | Ranade et al. |
| 2012/0093234 | A1 | 4/2012 | Rosenzweig et al. |
| 2013/0152088 | A1* | 6/2013 | Gkantsidis .............. G06F 16/24 718/100 |
| 2014/0028480 | A1 | 1/2014 | Fallon et al. |
| 2014/0140359 | A1 | 5/2014 | Kalevo et al. |
| 2015/0324385 | A1 | 11/2015 | Francis |
| 2016/0185459 | A1 | 6/2016 | Kiefer et al. |
| 2016/0198171 | A1 | 7/2016 | Wu et al. |
| 2017/0068458 | A1 | 3/2017 | Shin et al. |
| 2018/0089053 | A1* | 3/2018 | Chen ................... G06F 11/3428 |
| 2019/0114108 | A1 | 4/2019 | Trika et al. |
| 2019/0260387 | A1 | 8/2019 | Wegener |
| 2019/0260388 | A1 | 8/2019 | Wegener |

FOREIGN PATENT DOCUMENTS

| | | | |
|---|---|---|---|
| WO | 2016185459 | A1 | 11/2016 |
| WO | 2017223095 | A1 | 12/2017 |
| WO | 2017223114 | A1 | 12/2017 |
| WO | 2018204768 | A1 | 11/2018 |

OTHER PUBLICATIONS

Zou, et al., "FlexAnalytics: A Flexible Data Analytics Framework for Big Data Applications with I/O Performance Improvement," Big Data Research, Elsevier Inc., 2014, 10 pages.

Welton et al., "Improving I/O Forwarding Throughput With Data Compression," Advanced Scientific Computer Research, Office of Science, 2011, 8 pages.

Shieh et al, "Sharing the Data Center Network," NSDI 2011, Boston, MA, Mar. 30-Apr. 1, 2011, 14 pages.

Hou et al., "Understanding I/O Performance Behaviors of Cloud Storage from a Client's Perspective," IEEE, 2016, 12 pages.

Ghoshal et al., "I/O Performance of Virtualized Cloud Environments," Advanced Scientific Computing Research (ASCR), 2011, 10 pages.

Bocchi, et al., "Personal Cloud Storage Benchmarks and Comparison," IEEE Trans. on Cloud Computing, vol. 5, Issue 4, Apr. 28, 2015, 14 pages.

Bigelow, ed., "Network bottleneck looms when data center storage improves," (<https://www_techtarget.com/search/query?q=Networ k+bottleneck+looms+when+data+center+storag+improves> ) Sep. 4, 2015, 2 pages.

Barroso et al., "The Datacenter as a Computer, An Introduction to the Design of Warehouse-Scale Machines" Synthesis Lectures on Computer Architecture, 2013.

"An new parallel algorithm for LZ77 compression based on suffix array," https://github.com/zfy0701/Parallel-LZ77, as early as Jan. 2013, 2 pages.

"Enable Payload Compression for an API," AWS Documentation, https://docs.aws.amazon.com/apigateway/latest/developerguide/api-gateway-gzip-compression-decompression.html, downloaded Sep. 2019, 2 pages.

"Everything about the data compression", https://en.wikipedia.org/wiki/MSU_Lossless_Video_Codec,Moscow State University (MSU) web page, retrieved Jan. 21, 2020; last edited Jul. 10, 2019; last software update: Sep. 19, 2005 (v0.6.0).

"Google Cloud Platform Overview," https://cloud.google.com/docs/overview, 2019, 7 pages.

"How does ZFS Block Level Deduplication fit with Variable Block Size?", ServerFault, https://serverfault.com/questions/302584/how-does-zfs-block-level-deduplication-fit-with-variable-block-size, as early as Sep. 2011, 3 pages.

"How to enable the compression option in a REST service," Stackoverflow, https://stackoverflow.com/questions/27295926/how-to-enable-the-compression-option in a rest service, Dec. 2014, 3 pages.

"HTTP Methods," Rest API Tutorial, https://restfulapi.net/http-methods/, Downloaded Sep. 2019, 12 pages.

"Payload (computing" TechTarget Network, https://searchsecurity.techtarget.com/definition/payload, Mar. 2019, 5 pages.

"Performance Guidelines for Amazon S3," AWS, https://docs.aws.amazon.com/AmazonS3/latest/dev/optimizing-performance-guidelines.html, as early as Jan. 2019, 4 pages.

"Reading, Parsing and Unpacking," Bitstring, https://pythonhosted.org/bitstring/reading.html, downloaded in Sep. 2019, 5 pages.

Run-Length Encoding (RLE), http://eem.eskisehir.edu.tr/ongerek/EEM562/icerikkle.pdf, as early as Jan. 1999, 5 pages.

"S3 Object: Get Object," EMC ECS REST API, http://doc.isilon.com/ECS/3.3/API/S3ObjectOperations_getObject_f5c497b5fc79a08b9164ec22fa9016b7_ba672412ac371bb6cf4e69291344510e_detail.html, downloaded Sep. 2019, 2 pages.

Adamson, "Huffman encoding parallelization," https://pdfs.semanticscholar.org/3c42/43470e99ea83173053ba7a38db7be1cb0121.pdf, as early as Jan. 2017, 5 pages.

Adler, "pigz: A parallel implementation of gzip for modern multi-processor, multi-core machines," https://zlib.net/pigz/, Dec. 26, 2017, 1 page.

Almeida, et al., "Two High-Performance Alternatives to ZLIB Scientific-Data Compression,": B. Burgante et al. (Eds) ICCSA 2014, Part IV, LNCS 8582, Jun. 30-Jul. 3, 2014, 16 pages.

Alvarado, "What compression tools are available in Ubuntu that can benefit from a multi-core CPU?" https://askubuntu.com/questions/258202/multi-core-compression-tools, Feb. 19, 2013, 7 pages.

Amazon Simple Storage Service, API Reference, API Version 01 Mar. 2006, 800 pages.

Baker, "Decompression with pigz is not parallel," https://github.com/madler/pigz/issues/36, Sep. 22, 2016, 3 pages.

Benkovic, "Bit-level packing and unpacking," http://www.hashmismatch.net/libraries/packed-struct/, as early as Jan. 2015, 4 pages.

Bondy, "What is the best compression algorithm that allows random reads/writes in a file?" StackOverflow, https://stackoverflow.com/questions/236414/what-is-the-best-compression-algorithm-that-allows-random-reads-writes-in-a-file, Dec. 2008, 5 pages.

Burrows, et al., "A Block-sorting Lossless Data Compression Algorithm," Digiital SRC Research Report, May 10, 1994, 24 pages.

Burtscher et al., "High Throughput Compression of Double-Precision Floating-Point Data," IEEE Data Compression Conference, Mar. 27-29, 2007, Snowbird, Ut.

Chang et al., "A simple block-based lossless image compression scheme", 11th Asilomar Conference on Circuits, Systems, and Computers, https://www.researchgate.net/publication/3698187_A_simple_block-based_lossless_image_compression_scheme, 1977.

Coleman S., "Specify byte range via query string in Get Object S3 request," StackOverflow, https://stackoverflow.com/questions/26964626/specify-byte-range-via-query-string-in-get-object-s3-request/28166834, Nov. 17, 2014, 3 pages.

DeAgostino, "Lempel-Ziv Data Compression on Parallel and Distributed Systems," Algorithms, 4, Sep. 14, 2011, 17 pages.

Deutsch, "GZIP file format specification version 4.3," Aladdin Enterprises, May 1996, 13 pages.

Emms, "Best Linux Multi-Core Compression Tools," LinuxLinks, https://www.linuxlinks.com/best-linux-multi-core-compression-tools, Jan. 9, 2019, 6 pages.

Ferjani, "Flyimg: Resize, Crop and Compress images," https://www.slideshare.net/sadoknet/flyirng-resize-crop-and-compress-images-on-the-fly, May 12, 2018, 20 pages.

Fielding et al., "Hypertext Transfer Protocol—HTTP/1.1," http://www.w3.org/Protocols/rfc2616/rfc2616.txt, Jun. 1999, 152 pages.

Govindan et al., "IDBE—An Intelligent Dictionary Based Encoding Algorithm for Text Data Compression for High Speed Data Transmission Over Internet ," Proc. of Int'l Conf on Intelligent Signal Processing, Feb. 2004, 8 pages.

(56) References Cited

OTHER PUBLICATIONS

Gupta, "Study of Various Lossless Image Compression Technique", https://pdfs.semanticscholar.org/9262/f1ea98da9af034edbc5375e10f259dccd83c.pdf, International Journal of Emerging Trends & Technology in Computer Science (IJETTCS), vol. 2, Issue 4, Jul.-Aug. 2013.
Handsaker et al., "bgzip—Block compression/decompression utility," htslib-1.9, Jul. 18, 2018, 3 pages.
Jones et al., "JSON Web Encryption (JWE)," <http://www.rfc-editor.org/rfc/pdfrfc/rfc7516.txt.pdf>, May 2015, 51 pages. (ANAC 1001-2).
Kanjilal, "Compressing Web API responses to reduce payload," InfoWorld, https://www.infoworld.com/article/3174597/compressing-web-api-responses-to-reduce-payload.html, Feb. 27, 2017, 12 pages.
KinematicSoup Blog, "Data Compression: Bit-Packing 101," Sep. 6, 2016, 16 pages, https://www.kinematicsoup.com/news/2016/9/6/data-compression-bit-packing-101.
Klein et al., "Parallel Huffman decoding," Proc. Data Compression Conference DCC 2000, Mar. 28-30, 2000, 10 pages.
Latja, "Parallel Acceleration of H.265 Video Processing," Thesis, Aalto University, School of Science, Dec. 5, 2017, 72 pages.
Lemire "Fast integer compression: decoding billions of intergers per second," Daniel Lemire's blog (https://lemire.me/blog/2012/09/12/fast-integer-compression-decoding-billions-of-integers-per-second/), Sep. 12, 2012, 10 pages.
Levine et al., "FFT-Based Digital Audio Compression," Center for Computer Research in Music and Acoustics (CCRMA), Dept of Music, Stanford University, Stanford, California, Mar. 31, 2019, 9 pages.
Li, "Random access to zlib compressed files," Heng Li's blog, Jul. 5, 2014, 2 pages.
Linux Info, "Packet Header Definition," http://www.linfo.org/packet_header.html, Dec. 14, 2005, 1 page.
Loughman, "An Overview of Microsoft Azure Services," Feb. 6, 2019, 9 pages.
Mahoney, "Large Text Compression Benchmark," https://cs.fit.edu/~mmahoney/compression/text.html, as early as Jan. 2007, 48 pages.
Meenderinck et al., "Parallel Scalability of H.264," Proceedings of the first Workshop on Programmability Issues for Multi-Core Computers, Jan. 2008.
Moffat, "Word Based Text Compression," Journal of Software: Practice and Experience, Feb. 1989, 17 pages.
P. Bryan, ed., "JavaScript Object Notation (JSON) Patch," https://tools.ietf.org/html/rfc6902. Apr. 2013, 19 pages.
Pastemack, "MiGz for Compression and Decompression," https://engineering.linkedin.com/blog/2019/02/migz-for-compression-and-decompression, Feb. 20, 2019, 4 pages.
PCT/US2017/038349—International Preliminary Report on Patentability dated Jan. 3, 2019, 7 pages.
PCT/US2020/042932—International Search Report and Written Opinion dated Sep. 25, 2020, 10 pages.
PCTt/US2017/038388—International Search Report and Written Opinion dated Nov. 13, 2017, 13 pages.
PCT/US2018/031061—International Preliminary Report on Patentability (IPRP) dated Nov. 14, 2019, 6 pages.
PCT/US2018/031061—International Search Report and Written Opinion dated Jul. 20, 2018, 12 pages.
Pekhimenko, et al., "Exploiting Compressed Block Size as an Indicator of Future Reuse," IEEE 21st Int'l Symp. on High-Performance Architecture, Feb. 7-11, 2015, 13 pages.
Rosen, "REST Resource Representation Compression," REST API Tutorial, https://resffulapi.net/rest-resource-compression/, as early as Jan. 2019, 5 pages.
Schlegel et al., "Fast Integer Compression using SIMD Instructions," Proceeding DaMoN '10, Proceedings of the Sixth International Workshop on Data Management on New Hardware, Indianapolis, IN, Jun. 7, 2010, 7 pages.
Shun et al., "Practical Parallel Lempel-Ziv Factorization," IEEE Proc Data Compression Conf. DCC, Mar. 20-22, 2013, 10 pages.
Sitaridi, et al., "Massively-Parallel Lossless Data Decompression," IEEE 45th Int'l Conf on Parallel Processing (ICPP) Aug. 16-19, 2016, 10 pages.
Sumo Logic, "AWS 101: An Overview of Amazon Web Services," May 21, 2019, 19 pages.
Ticki, "On Random-Access Compression," http://ticki.github.io/blog/on-random-access-compression, Oct. 23, 2016, 8 pages.
Van Winkle, "Optimal Bit Packing," Code Plea Blog, Nov. 21, 2009, 4 pages.
Wahba, et al., "Lossless Image Compression Techniques Comparative Study", https://www.researchgate.net/publication/296674534_Lossless_Image_Compression_Techniques_Comparative_Study, International Research Journal of Engineering and Technology (IRJET), vol. 3, Issue 2, Feb. 2016.
Welch, "A Technique for High-Performance Data Compression," IEEE Computer, vol. 17, Issue 6, Jun. 1984, 12 pages.
White, "Private vs. Public Cloud: What's the Difference," https://www.expedient.com/blog/private-vs-public-cloud-Whats-difference/, 2018, 5 pages.
Ziv et al. "A Universal Algorithm for Sequential Data Compression," IEEE Transactions on Information Theory, vol. IT-23, No. 3, May 1977, 7 pages.
PCT/US2017/038349—International Search Report dated Oct. 25, 2017, 13 pages.
PCT/US2017/038388—International Preliminary Report on Patentability dated Dec. 25, 2018, 7 pages.

* cited by examiner

ACCELERATED DATA CENTER TRANSFERS

PRIORITY APPLICATION

Benefit of U.S. Provisional Patent Application No. 62/877,150, filed 22 Jul. 2019 is claimed.

BACKGROUND

Computations by computers are increasingly being performed on rented software and hardware, instead of on purchased software and hardware. The term "private Cloud" infrastructure, or "private data centers" often refers to purchased hardware and software that operates Information Technology (IT) applications. In contrast, the term "public Cloud" infrastructure or "public data centers" often refers to rented hardware and software that operates IT applications. The term "data center" refers to such IT infrastructure that operates IT applications. In general, public Cloud costs are billed on a monthly basis as an operating expense (OpEx) and are based on usage levels. In contrast, private Cloud costs are billed once as a Capital Expense (CapEx) that is amortized over the life of the data center, based on purchased capacity (such as storage capacity). Current (2019) trends favor public Cloud being less expensive (and thus more popular, growing more quickly, and more widely deployed) than private Cloud.

A typical data center houses multiple (typically thousands of) instances of IT infrastructure.

IT infrastructure is typically divided into three types of components:
- servers (which run IT applications using one or more Central Processing Units [CPUs]),
- storage (which hold the input data upon which IT applications operate, and also hold the resulting intermediate and/or output data generated by IT applications), and
- networking equipment (consisting of routers, switches, and networking cables that together connect storage with servers, and also connect servers with other servers).

As of 2019, storage requirements for Cloud data are increasing at about 35% per year. At this growth rate, Cloud storage represents a significant and growing IT CapEx investment for both private and public Clouds. Despite public Clouds receiving revenue as OpEx from customers, public Cloud providers still spend CapEx for IT infrastructure (storage, networking, and servers).

Increases in the throughput (bandwidth) of networking equipment components typically occur every few years, such as when 1 Gbps networking equipment was replaced by 10 Gbps networking equipment during the approximate years 2000-2010. Such networking speed improvements are attractive because they support faster data transfers between storage and servers, or between servers and other servers. Typically, such networking transfers require a "forklift upgrade" of all IT infrastructure networking equipment components, but "forklift upgrades" are expensive because they require the replacement of most or all data center networking equipment.

Compression algorithms reduce the cost of storage space and can increase the speed of storage transfers by reducing the amount of data transferred across networks by reducing the size or number (or both) of network data packets. However, compression algorithms have historically been restricted to certain limited use cases, have not performed well on all types of data, and have not supported random access into the compressed stream of data. For this reason, compression algorithms have not been used to accelerate generic network transfers. If a compression method were available that effectively compressed all data types stored in data centers while also supporting random access, such a compression method would improve the speed of network transfers because fewer (compressed) bits could be transferred in place of the original (uncompressed) data was requested by various IT applications. Further, if the decoding of this compression method were performed in such a way that networking transfers only or mostly carried compressed data, rather than uncompressed data, such transfers would occur at an accelerated speed.

SUMMARY

This specification describes a system that accelerates network transfers without requiring a "forklift upgrade" of existing data center networking equipment, by using one or more software threads to decode data in the same rack where the application that requested the data is running. Technology described herein uses a block-oriented lossless compressor that encodes data using one or more servers prior to writing the encoded (compressed) data to storage. Technology described herein uses a block-oriented lossless decompressor to decode encoded data fetched from storage that is subsequently transferred across a network in encoded (compressed) form. In examples described herein, applications executing at network nodes send GET requests to storage systems, which can return compressed data this is decompressed in an intermediate node (between the storage node and the app), and can return compressed data that is decoded in the same network node in which the requesting application is running. Decoding can thus be performed using one or more cores within the same server rack, prior to delivering the decoded (decompressed) data to the IT application that requested that data. The present technology can both reduce storage costs and increase effective networking throughput (bandwidth) without requiring a forklift upgrade of data center networking equipment.

BRIEF DESCRIPTION OF THE DRAWINGS

FIG. 4b illustrates the temporal sequencing of software functions during the encoding of FIG. 4a.

FIG. 4c illustrates the mapping between components in FIG. 4a and the SW sequence in FIG. 4b.

FIG. 5b illustrates the temporal sequencing of software functions during the decoding of FIG. 5a.

FIG. 5c illustrates the mapping between components in FIG. 5a and the SW sequence in FIG. 5b.

FIG. 6b illustrates the temporal sequencing of software functions during the decoding of FIG. 6a.

FIG. 6c illustrates the mapping between components in FIG. 6a and the SW sequence in FIG. 6b.

DETAILED DESCRIPTION

As used herein, a network node is an active electronic device that is attached to one or more networks having a data link address, such as a MAC (Media Access Layer) address, for each of the one or more networks, and executes applications capable of sending, receiving, or forwarding data on the physical media (e.g., wireless, optical, wired) of the one or more networks. Examples of electronic devices which can be deployed as network nodes, include all varieties of computers, rack mounted multi-core processors, work stations, laptop computers, hand held computers and smart phones. Network nodes can be classified in some networks, such as data center networks, as compute nodes and as storage nodes, depending on the primary functions of applications executed on the nodes. In some networks, network nodes may include individual personal computers, laptops, etc. that are attached to the Internet, where the Internet itself serves as the Network attaching nodes to each other, via the Internet.

As used herein, the term "Internet" is used to refer to a communications network that connects computer networks and organizational computer facilities around the world, including for example networks utilizing IP addresses in a network layer.

The term server is used herein at times apparent from context, to refer to one or more network nodes configured to execute a server application, and at times to refer to server side applications themselves which can be executed using one or more network nodes.

Figure 1:
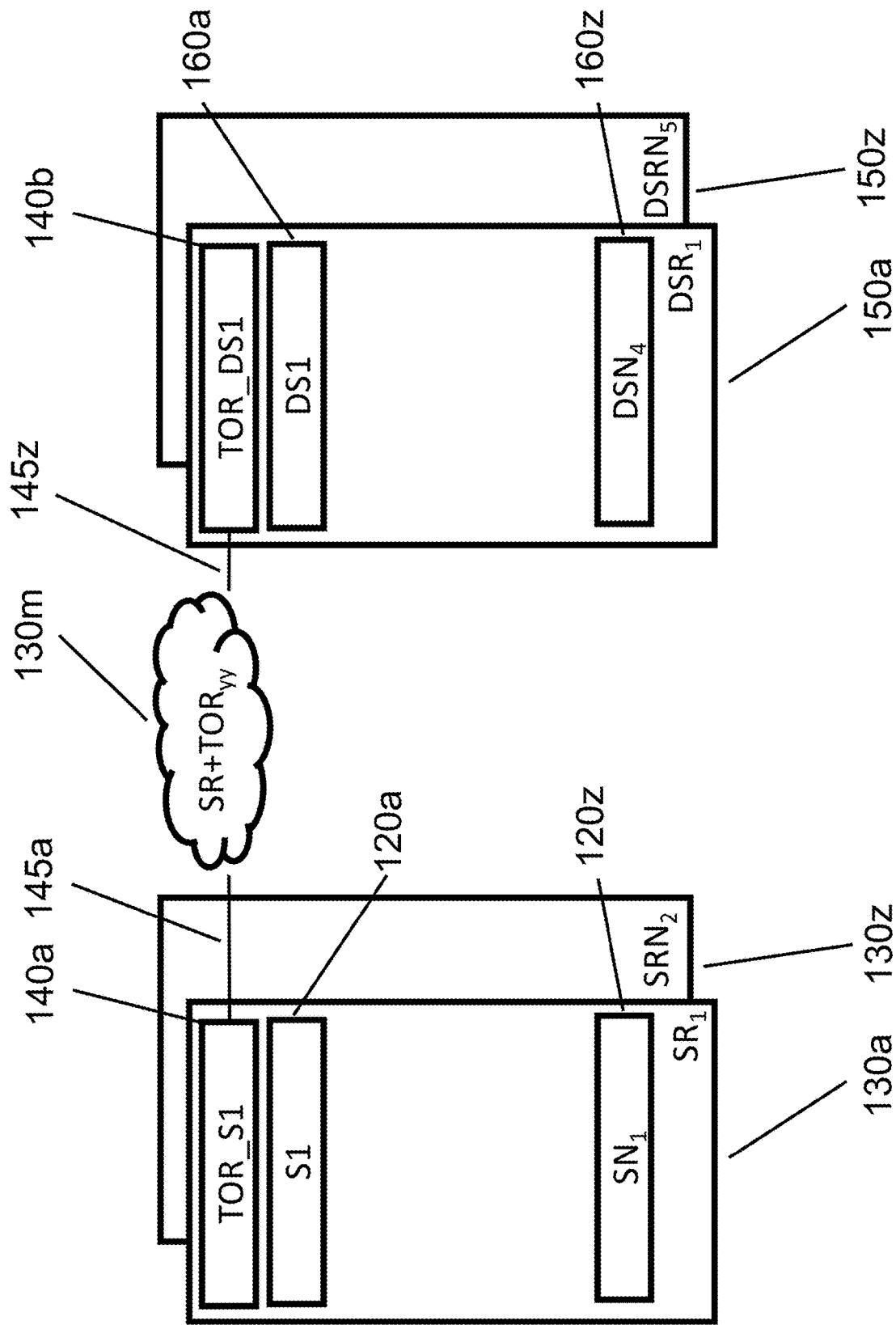
FIG. 1 illustrates typical Cloud data center server, storage, and networking components that are typically mounted in data center racks.

FIG. 1 illustrates data center compute and storage components. FIG. 1 illustrates the three components found in a typical private or public data center: servers 120, networking 140, and storage 160. Storage 160 components can include both hard disk drive (HDDs) and solid state disks (SSDs). In the sense defined in the previous paragraph, servers 120 and storage 160 are typical "nodes" can communicate with each other using networking 140, which may be the Internet, a dedicated Ethernet network within a data center, etc. FIG. 1 illustrates a typical rack-oriented deployment of both compute servers and storage components in data centers. Racks are typically metal enclosures having the following approximate dimensions: 24" wide, 78" tall, and 40" deep. Data center rack dimensions can vary, but their dimensions do not affect the utility or implementation of the present innovation. Most data centers include a Top of Rack (TOR) switch, shown as components 140 in FIG. 1.

FIG. 1 illustrates two types of data center racks 130 and 150, holding server 120 components and storage 160 components, respectively. Racks may contain server 120 components (CPU plus memory plus optional SSDs and/or HDDs) exclusively, storage (SSDs and/or HDDs plus their associated controllers and/or servers), or a combination of server 120 and storage 160 components. Many data centers use the top-most rack position to hold a top-of-rack switch 140 (TOR), which provides the ports for networking gear that connects server racks 130 to each other, and to storage racks 150, typically via one or more Ethernet or fiber-optic cables. In FIG. 1, elements 120a thru 120z indicate multiple servers 120 in Server Rack 130a. Similarly, FIG. 1 illustrates multiple storage components 160a . . . 160z in Data Storage Rack 150a. FIG. 1 intends components 120 to represent one or more server components in data center racks 120, not necessarily 26 components as might be assumed from the letters a . . . z. Similarly, FIG. 1 intends components 160 to represent one or more storage components in data center storage racks 150, not necessarily 26 components as might be assumed from the letters a . . . z.

Figure 2:
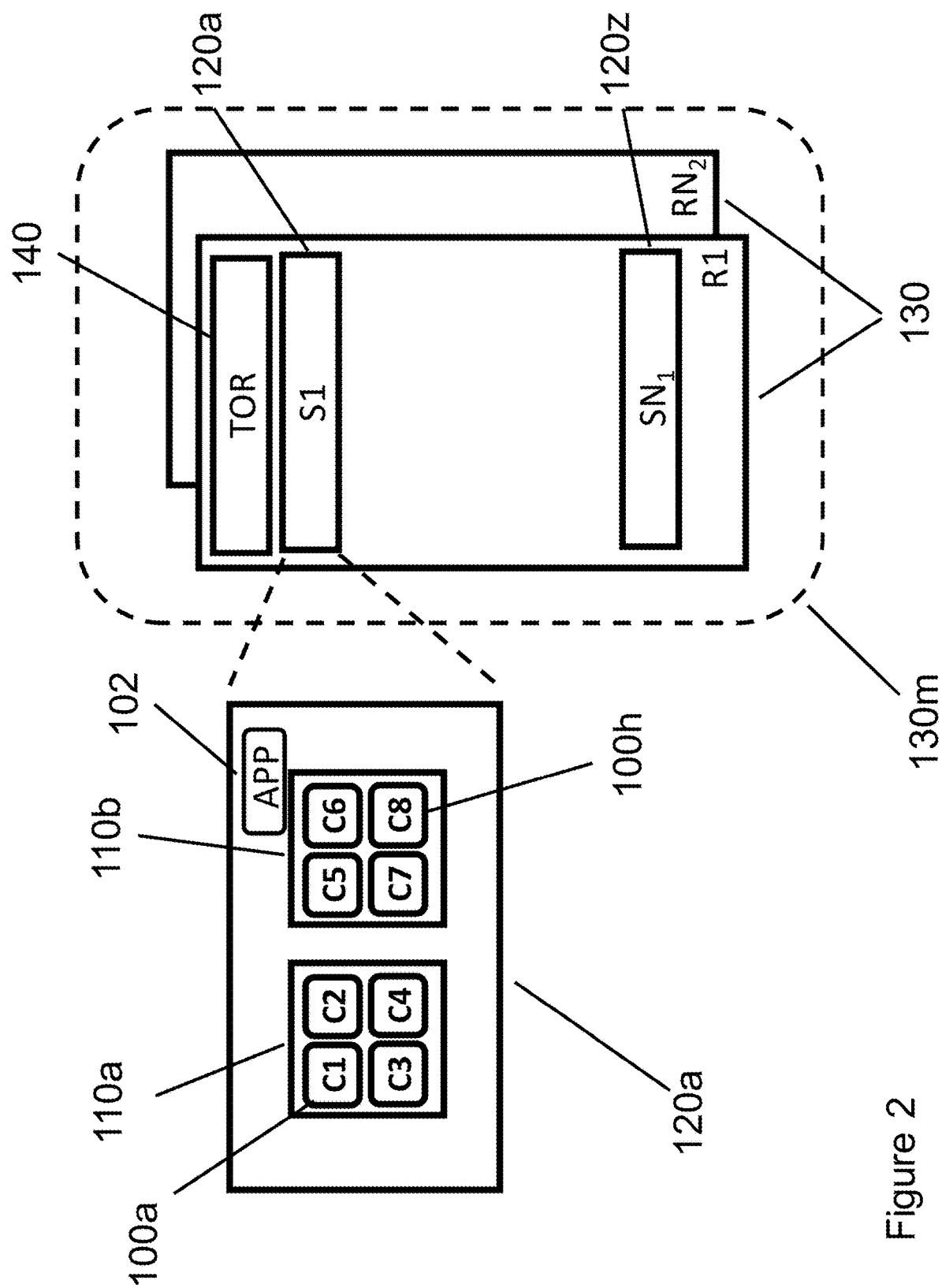
FIG. 2 shows an expanded view of one server, with two sockets having four CPU cores per socket.

FIG. 2 contains an expanded view of the compute components within server 120a. In FIG. 2, the example compute server 120a contains two multi-core compute sockets 110a and 110b. In FIG. 2, each compute socket 110a and 110b contains four cores 100. Core 100a represents the first of four cores in compute socket 110a, and core 100h represents the fourth of four cores in compute socket 110b. For simplicity, FIG. 2 omits various electronic and mechanical components that are typically also found within server racks, such as dynamic random-access memory [DRAM] dual in-line memory modules [DIMMs], printed circuit [PC] boards, backplanes, cables, power supplies, cooling channels, fans, etc. Those skilled in the art of data center design will recognize that when element 120 in FIG. 2 represents a compute server, it can be used as a core (computational element) to execute any IT application, including block-based encoder software 500 (not shown in FIG. 2), block-based decoder software 600 (not shown in FIG. 2), or any generic IT application 102 (shown in FIG. 2 and subsequent figures). As of 2019, examples of multi-core compute ICs 110 include the Intel Xeon Scalable family of data center CPUs (sockets) and the AMD Epyc family of multi-core data center CPUs (sockets).

Figure 3:
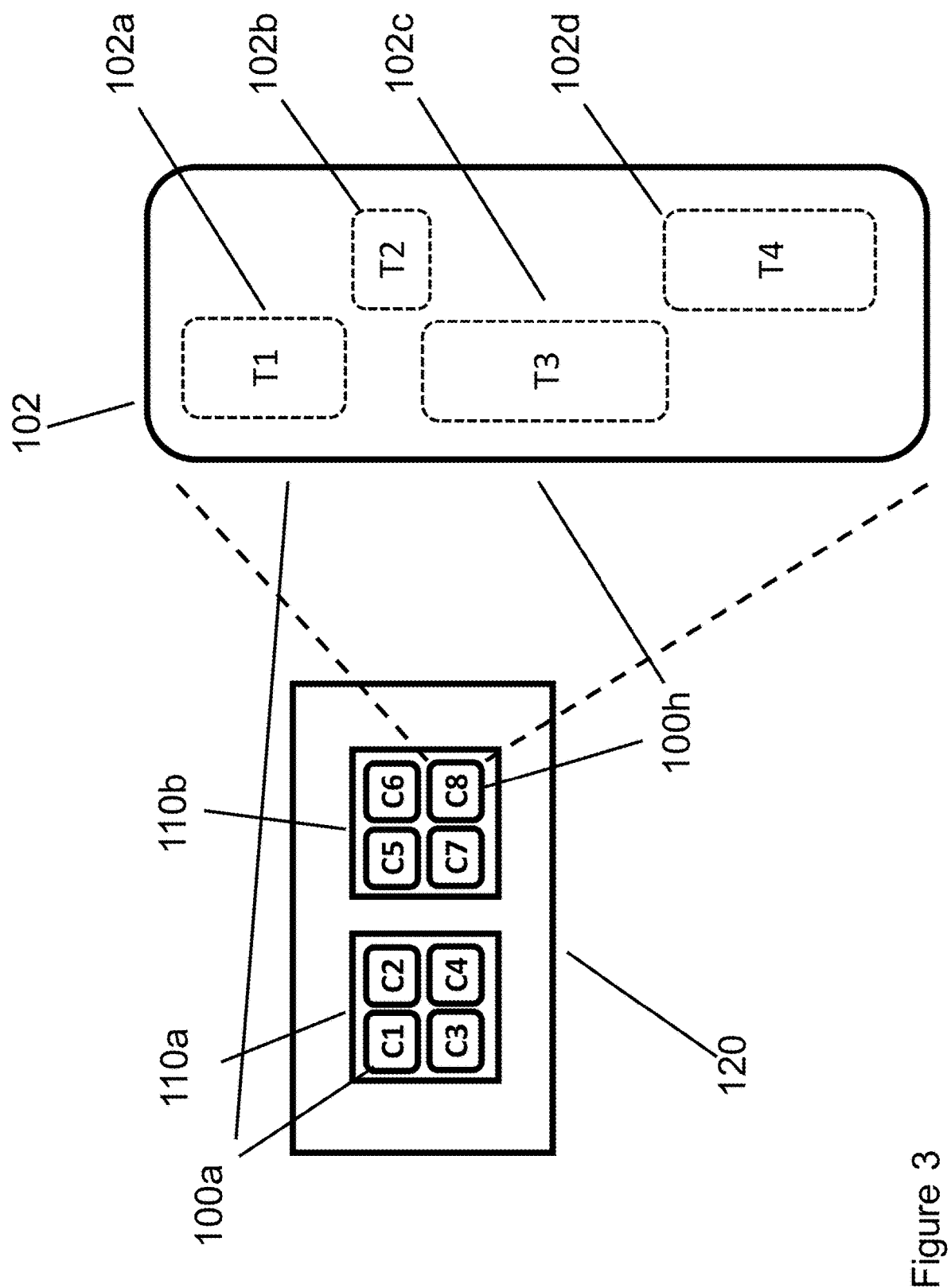
FIG. 3 illustrates two software threads operating in one hyper-threaded core.

FIG. 3 illustrates how a core 110 supports hyper-threading: the ability to run two software threads sequentially using one core. The example shown in FIG. 3, in which core 100h supports hyper-threading, illustrates how two threads are interleaved to support hyper-threading of two software processes. A first software process A consists of Thread T1 102a and Thread T3 102c, while a second software process B consists of Thread T2 102b and Thread T4 102d. Whenever a thread is "stalled" (i.e. is waiting for data), the other hyper-threaded process is swapped in and begins processing. In FIG. 3, time (not shown in FIG. 3) is assumed to run from the top of the figure to the bottom of the figure, so thread T1 102a runs, then thread T2 102b runs, then thread T3 102c runs, then thread T4 102d runs. In the context of the innovation herein described, software processes A and B may include encoder software 500, decoder software 600, or generic IT application 102.

Figure 4A:
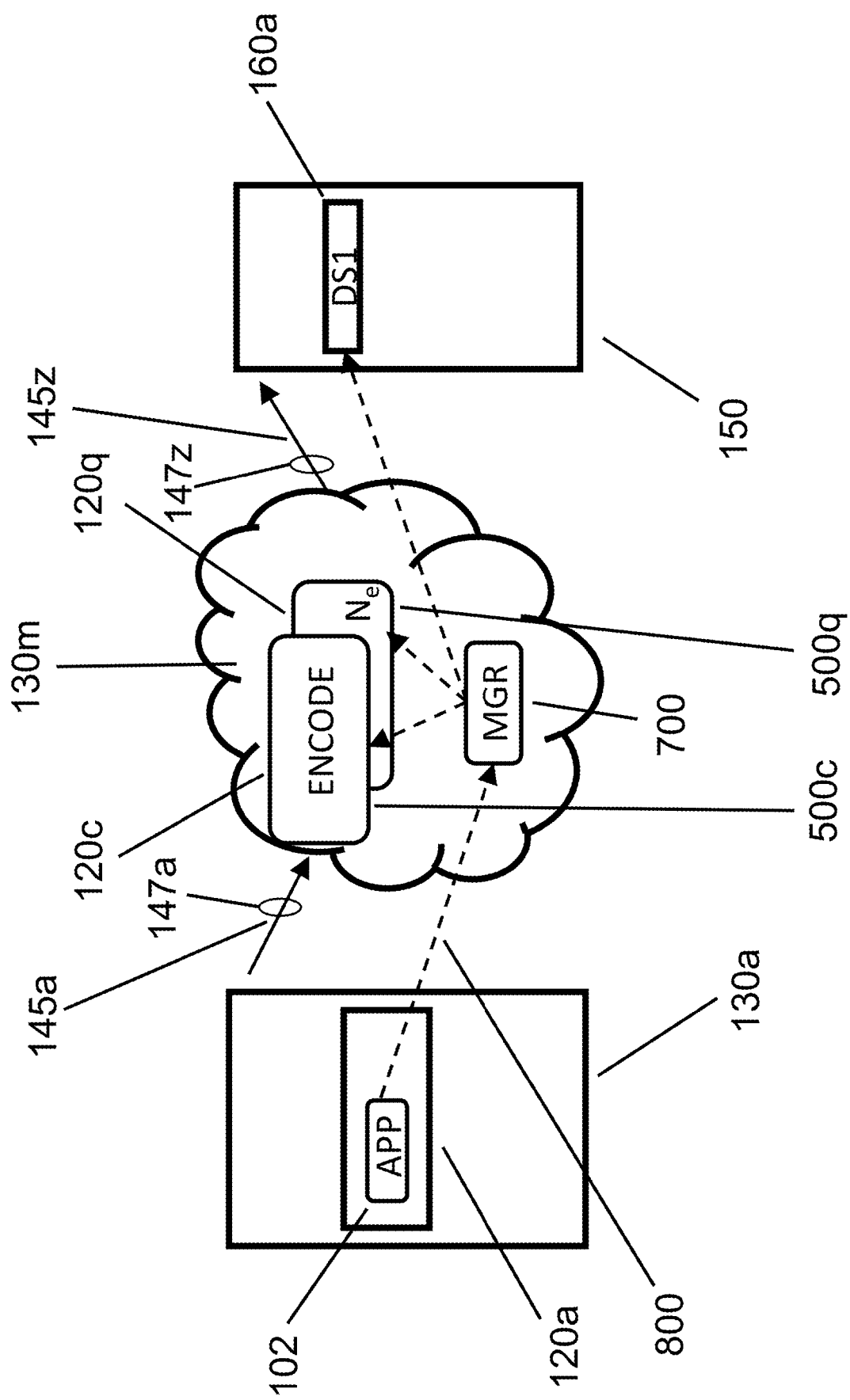
FIG. 4a shows an application's data being encoded by multiple, block-oriented microservices.

FIG. 4a illustrates an example of the operation of a block-oriented encoder software 500 that uses microservices software, such as Amazon Web Services Lambda, Microsoft Azure Compute functions, or Google Compute Functions. Microservices are a perfect fit for a block-oriented encoder (compressor), since each block of a block-oriented encoder is automatically scheduled and run under the control of microservice manager 700. In FIG. 4a, Ne encoders run in parallel, encoding the data provided by application 102 that runs in Server 120a that is located in server rack 130a. Using networking connection 145a that operates at a rate of (for example) 100 Gbps 147a, application 102 transmits its data to be encoded to servers in cluster 130m, in which Ne encoders are implemented using servers 120c . . . 120q, under the control of microservices manager 700. Encoder software 500 instances 500c . . . 500q operate in servers 120c . . . 120q, respectively, under the control of microservices manager 700, generating encoded data packets. Encoder software 500 typically compresses its input blocks, generating encoded data packets that are then transmitted across network connection 145z that operates at (for example) 100 Gbps 147z, to storage element DS1 160a in storage rack 150. Because the compressed blocks sent across network connection 145z are smaller than the original blocks that were sent across network connection 145a, the total amount of data stored in storage element DS1 160a is smaller than it would have been without encoding (compression) provided by encoder software 500. Thus after block-oriented encoding provided by encoder software 500, application data sent by application 102 can be stored as encoded data packets in fewer bits, and at a lower cost, in data storage element 160a. Without loss of generality, it is noted that multiple storage elements 160, rather than one storage element 160a, could store the encoded data packets generated by encoder software 500 that is subsequently stored in storage elements 160 in storage rack 150.

Figures 4B, 4C:
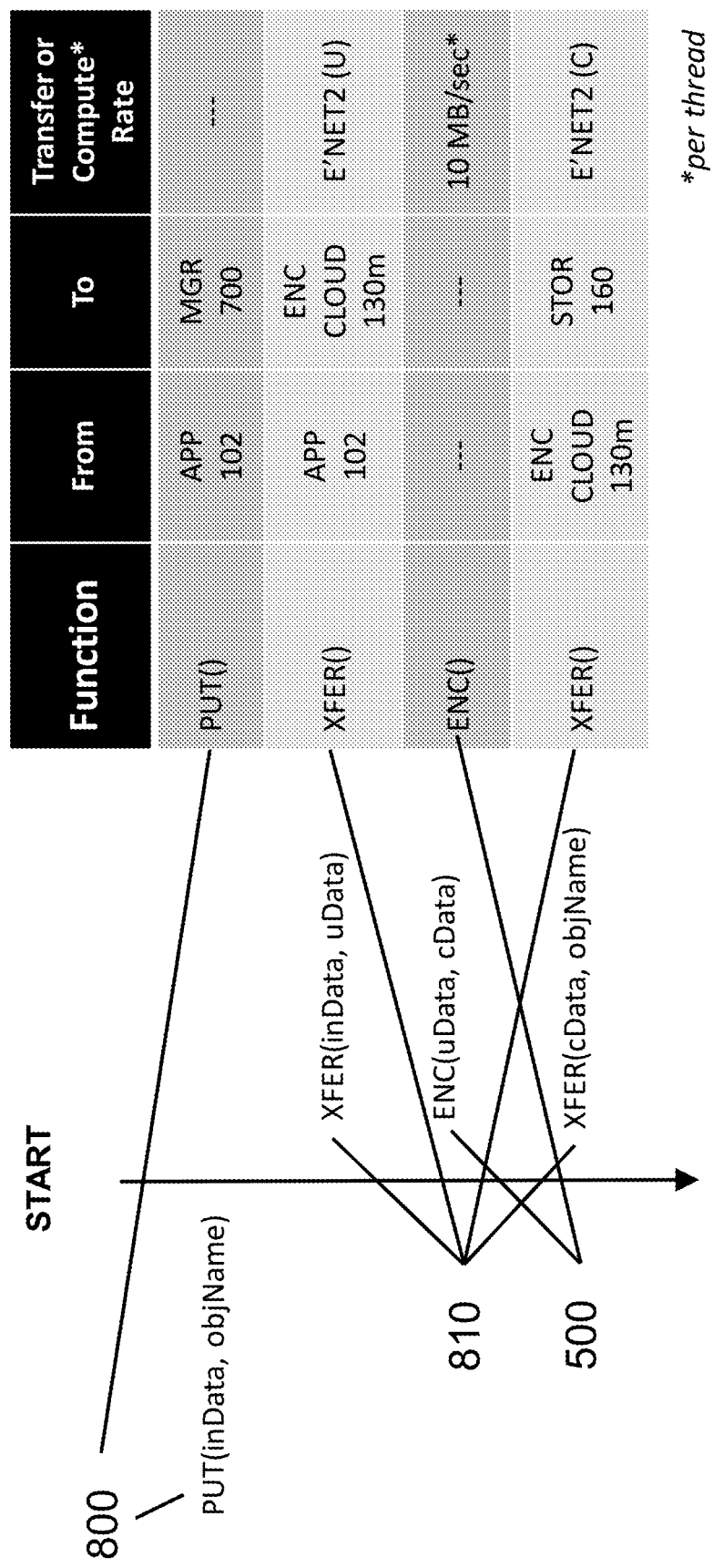

FIG. 4b illustrates the Application Programming Interface (API) calls executed by application 102 in FIG. 4a, starting with PUT(inData, objName) API call 800. Referring back to FIG. 4a, data flows between physical components server 120a through network connection 145a to one or more encode servers 120c . . . 120q, and then from encode servers 120c . . . 120q through network connection 145z to storage component 160a. FIG. 4c lists in tabular form details of the corresponding transfers and or computations performed in FIG. 4b. PUT(inData, objName) API call 800 is issued to microservices manager 700. API call 800 specifies where the input data (inData) to be encoded is found in application 102's memory space, and where the data is stored in storage element 160c (objName). PUT API call 800 is implemented through two data transfer operations 810 and one call to encoder software 500. The first XFER API call 810 manages the transfer of uncompressed inData from server 120a running application 102 to encoder software 500c . . . 500q running in encoder cloud 130m on servers 120c to 120q, under the control of microservices manager 700. The encoding process (controlled by microservices manager 700) is then performed by encoder software 500, which takes subset uData from inData and generates a compressed packet cData from each input block of uData. The second XFER API call 810 transfers cData for storage in storage component 160a, associated with objName.

In the encoding example of FIG. 4, we note that fewer bits are stored in storage element 160a that are delivered by application 102 to encoder software 500, because encoder software 500 compresses each input data block into a smaller compressed output packet, or into fewer output packets, which are subsequently stored in storage element 160a. Because compression is performed in encoding cluster 130m (under the control of microservices manager 700), uncompressed data flows between application 102 running on server 120a to encoder software 500 running on encode servers 120c . . . 120q. In contrast, during encoding, compressed data flows from encoder servers 120c . . . 120q to storage element 160a. Thus in FIG. 4, during encoding (PUT API calls), more (uncompressed) data flows across the network connections between app server 120a and encoder servers 120c . . . 120q, while less (compressed) data flows across the network connections between encoder servers 120c . . . 120q to storage element 160a.

Figure 5A:
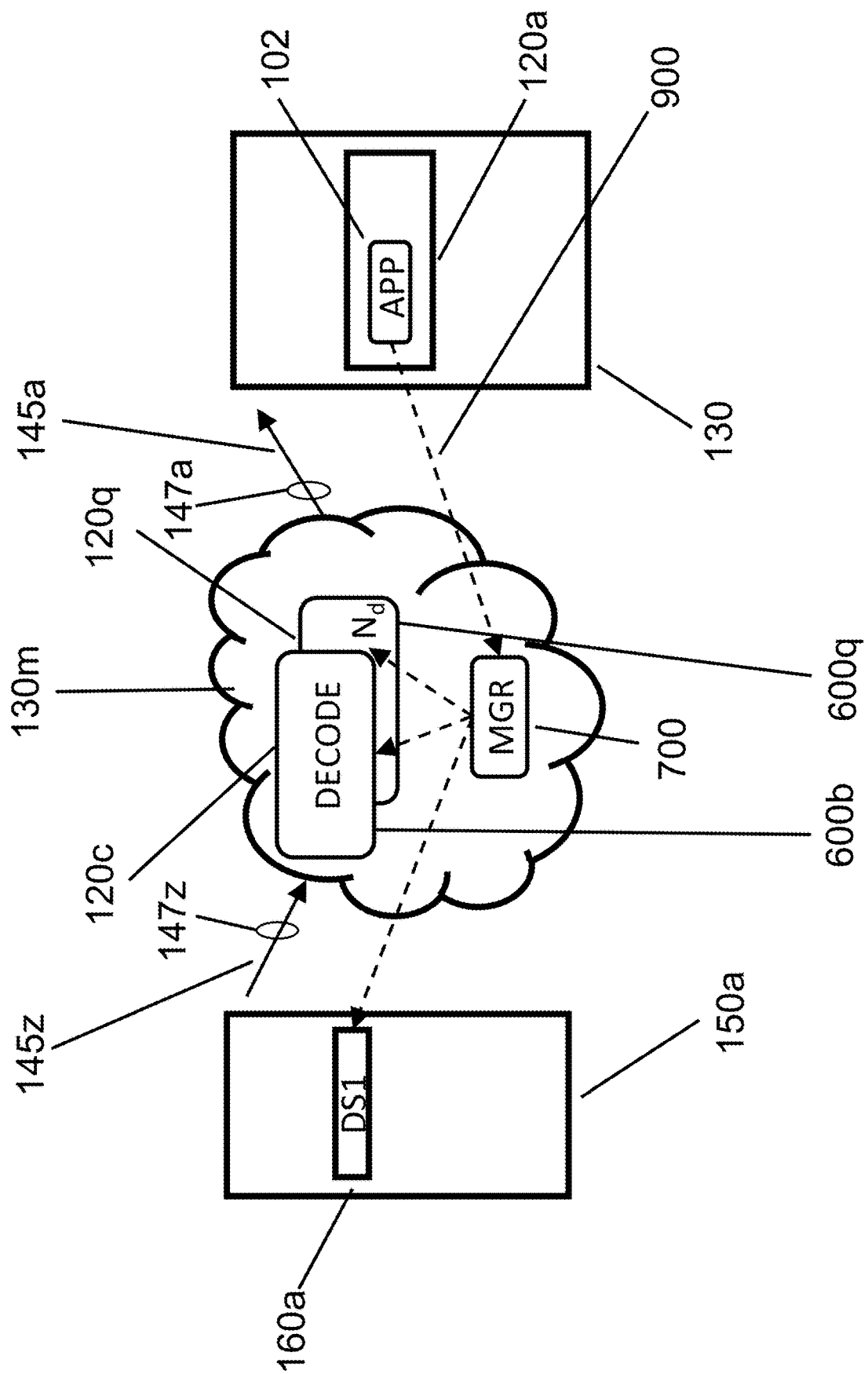
FIG. 5a shows an application's data being decoded by multiple, block-oriented microservices.

FIG. 5a illustrates the operation of a block-oriented decoder software 600 that uses microservices software, such as Amazon Web Services Lambda, Microsoft Azure Compute functions, or Google Compute Functions. Microservices are a perfect fit for a block-oriented decoder (decompressor), since each block of a block-oriented decoder can be automatically scheduled and run under the control of the microservice. In the example shown in FIG. 5a, $N_d$ instances of decoder software 600 run in parallel, decoding the data provided by storage element DS1 160a from storage rack 150a. Using networking connection 145z that operates at a rate of (for example) 100 Gbps 147z, storage element 160a transmits compressed data to cluster 130m, in which $N_d$ decoders are implemented using available software threads, under the control of microservices manager 700. Decoder software 600 operates in one thread of servers 120c . . . 120q, under the control of microservices manager 700, generating decoded data blocks. Decoder software 600 decompresses compressed packets, generating uData decompressed blocks that are then transmitted across network connection 145a that operates at (for example) 100 Gbps 147a, to application 102 running in server 120a of server rack 130a. Because the compressed blocks sent across network connection 145z from storage element 160a to cluster 130m are smaller than the decompressed blocks that are sent across network connection 145a, data moves faster across network connection 145z (which carries compressed packets from storage element 160a to decoder servers 120c . . . 120q) than across network connection 145a, which carries decompressed blocks from decoder servers 120c . . . 120q to app server 120a.

Figures 5B, 5C:
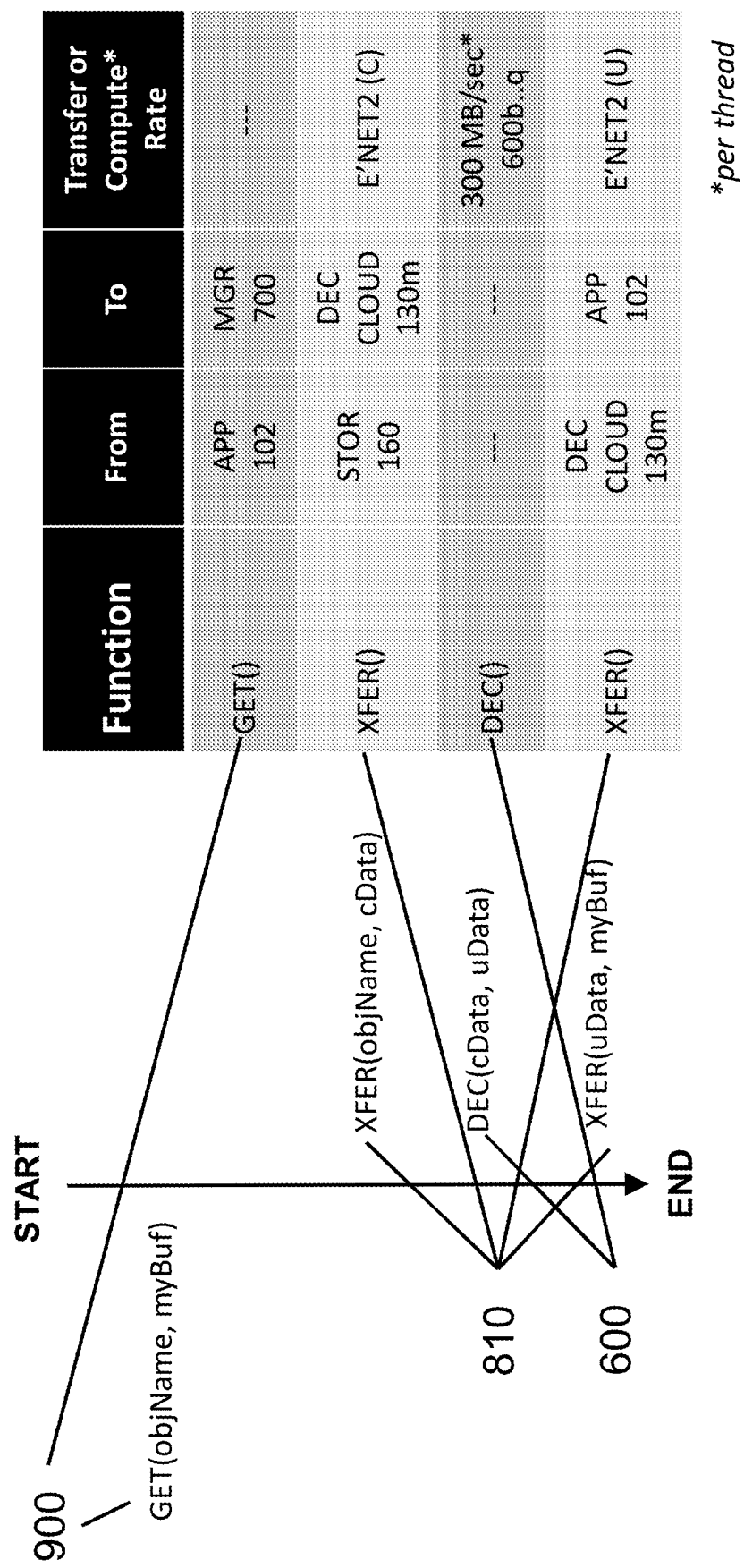

FIG. 5b illustrates the Application Programming Interface (API) calls executed by application 102 in FIG. 5a, starting with GET(objName, myBuf) API call 900. Referring back to FIG. 5a, data flows between physical components data storage element 160a through network connection 145z to a decode servers 120c . . . 120q, and then from decoder servers 120c . . . 120q through network connection 145a to application server 120a running application 102.

FIG. 5c lists in tabular form the corresponding transfers and or computations performed in FIG. 5b. GET(objName, myBuf) API call 900 is issued to microservices manager 700, which specifies at the highest level where the compressed data (inData) to be decoded is found in storage element 160c (where the compressed object objName is stored). The GET API call is then implemented through a series of two XFER data transfer operations 810 and a series of decoder software 600. The first XFER API call manages the transfer of objName compressed packets from data storage element 160a to decoder software 600c . . . 600q running in encoder cloud 130m on servers 120c to 120q, under the control of microservices manager 700. The decoding process (controlled by microservices manager 700) is then performed by decoder software 600 running on servers 120c . . . 120q, which takes subset cData and generates the corresponding decompressed block uData from each compressed packet cData. The second XFER API call transfer uData to application 102 running in server component 120a, where each uData blocks received from decode servers 120c . . . 120q are re-assembled in the proper order by software controlled by microservices manager 700.

In the decoding example of FIG. 5, because decompression is performed in encoding cluster 130m (under the control of microservices manager 700), compressed data flows between storage element 160a to decoder software 600 running on decode servers 120c . . . 120q. In contrast, during decoding, decompressed data flows from decoder servers 120c . . . 120q to application server 120a. Thus in FIG. 5, during decoding (GET API calls), less (compressed)

data flows across the network connections between storage element 160a to decode servers 120c . . . 120q, while more (decompressed) data flows across the network connections between decode servers 120c . . . 120q to application server 120a.

We now identify a weakness of the decoding method illustrated in FIG. 5. Because decoding is done BEFORE server 120a that runs application 102, network connections 145a from decode servers 120c . . . 120q carry uncompressed data to application server 120a, which slows down the GET API call compared to the alternative method that we are about to describe in FIG. 6. The inventive method described in FIG. 6 of this innovation preserves the compressed data format as the data flows from storage element 160a (which stores compressed data packets) to application server 120a and then performs "just in time" decoding in the same server 120a where application 102 is running (see FIG. 7a), or in a server that is also located in the same server rack 130 (see FIG. 7b) where server 120a is located.

FIG. 6 illustrates that by running decoder software 600 in server 120a, all networking components 145a . . . 145z transmit encoded (compressed) data. Thus by transferring compressed data all the way from storage element 160a (where the data is already stored in compressed packets) to application server 120a, network transfers across all networking components 145 transfer compressed packets. In contrast, the method described in FIG. 5, which performed decompression using decoder software 600 that was implemented using microservices, sent decompressed data, not compressed data, from the decode microservices servers 120c . . . 120q to application server 120a.

Figure 6A:
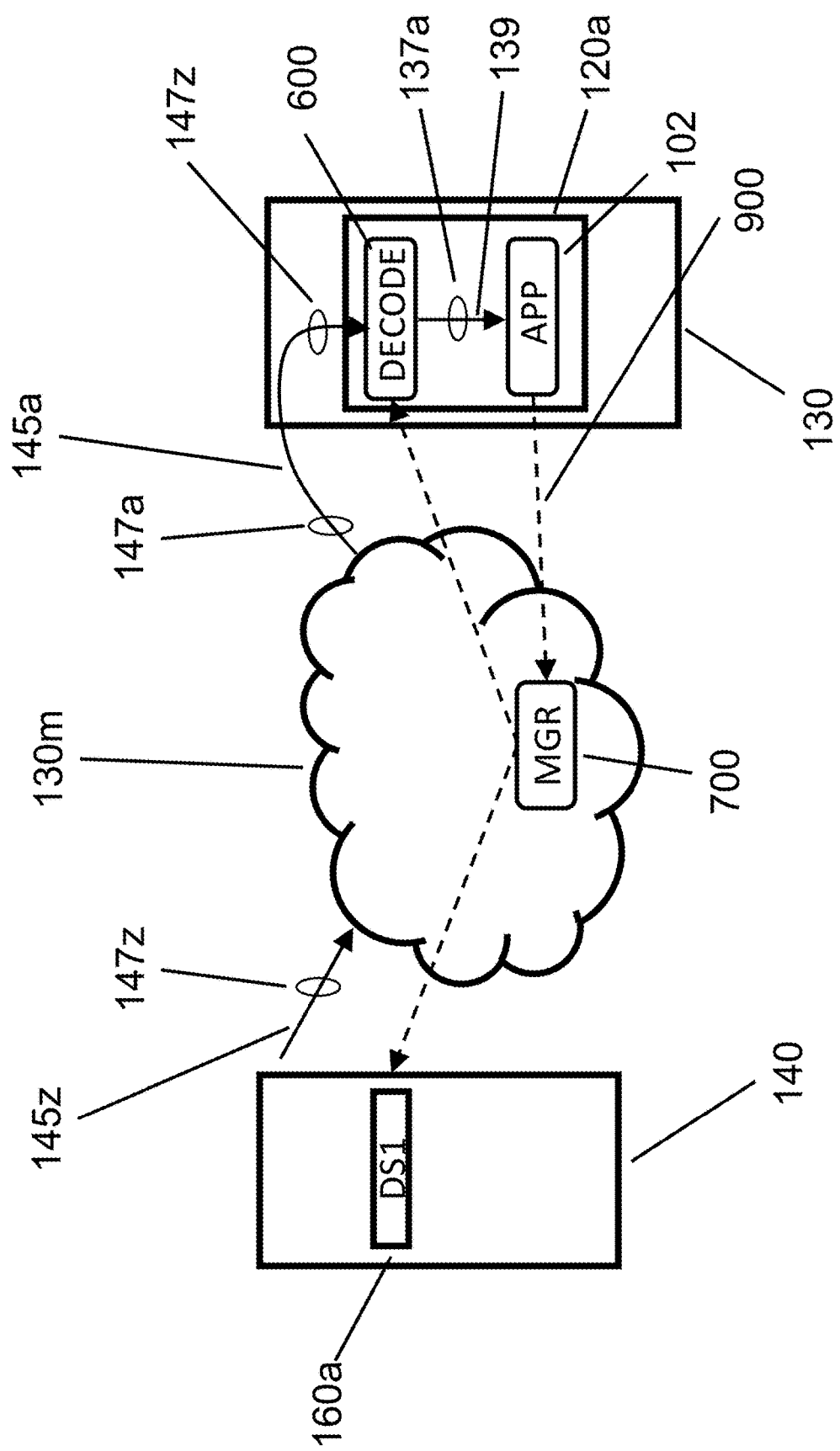
FIG. 6a shows an application's data being decoded by one or more threads that execute in the same rack where the application is running.

FIG. 6a illustrates the operation of a block-oriented decoder software 600 that operates in application server 120a, where application 102 also runs. In FIG. 6a, $N_d$ instances of decoder software 600 run in parallel, decoding compressed data packets that were transmitted across networking interface 145. Using networking connection 145 that operates at a rate of (for example) 100 Gbps 147z and 147a, storage element 160a transmits compressed packets to application server 120a. Decoder software 600 operates in one thread in a core of server 120a, under the control of microservices manager 700 or a container scheduler (such as Kubernetes, not shown in FIG. 6), generating decoded data blocks. Decoder software 600 decompresses compressed packets, generating uData decompressed blocks that are then stored in myBuf DRAM buffer specified by GET call 900 of FIG. 6b. Because the compressed blocks sent across network connection 145z from storage element 160a to server 120a (which runs both decoder software 600 and application software 102), data is transferred faster (in compressed format) from storage element 160a to application server 120a running application software 102.

Figures 6B, 6C:
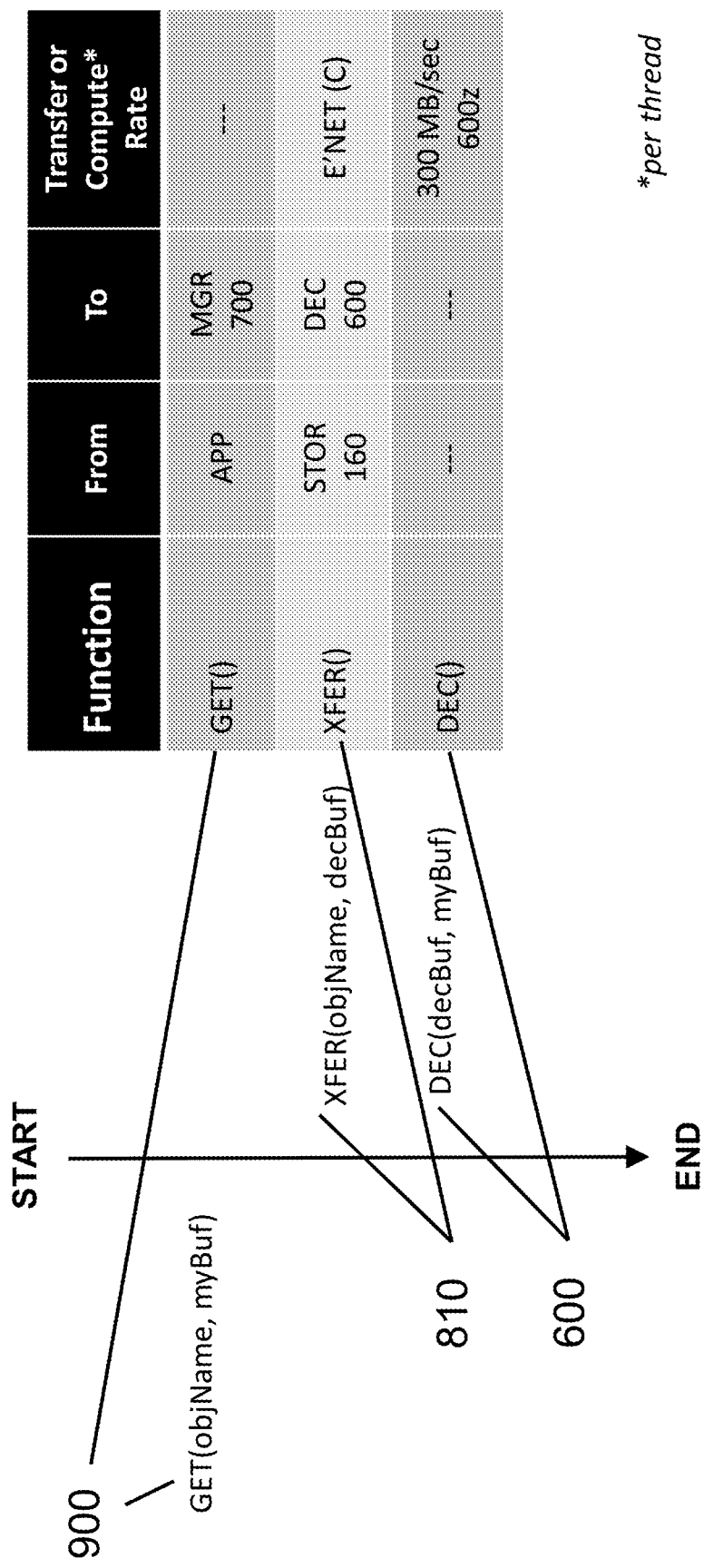

FIG. 6b illustrates the Application Programming Interface (API) calls executed by application 102 in FIG. 6a, starting with GET(objName, myBuf) API call 900. Note that this is the SAME API call shown in FIG. 5a. Referring back to FIG. 6a, compressed data packets flow between data storage element 160a through network connection 145 to decode server 120a running decoder software 600. Decoded data is passed from decoder software 600 running in server 120a to application 102, also running in server 120a.

FIG. 6c lists in tabular form the corresponding transfers and or computations performed in FIG. 6b. GET(objName, myBuf) API call 900 is issued by application 102 to microservices manager 700, which specifies where the compressed data (inData) to be decoded is found in storage element 160c, where the compressed object objName is stored. The GET API call is then translated into two data transfer operation 810 and one call to decoder software 600. API call 810 manages the transfer of compressed packets corresponding to objName from data storage element 160a to decoder software 600c . . . 600q running on application servers 120a, under the control of microservices manager 700. The decoding process (controlled by microservices manager 700) is then performed by decoder software 600 running on application server 120a, which takes compressed packet cData and generates the corresponding decompressed block uData, which is stored in myBuf as requested by the original GET AP call.

As illustrated in FIG. 6, data remains compressed from storage element 160 to application server 120a, where application 102 is running. Application 102 requested the data via the original GET API call).

It will be understood by those skilled in the art of information technology that the innovation described herein simultaneously reduces storage costs and accelerates data transfers in both private and public data centers. Thus applications using this innovation will operate faster, because the data they request is transmitted from storage to servers in compressed form and thus is transmitted in less time than transmitting uncompressed data would have required, and will also cost less, because the data is stored in compressed form.

We note that the decoder software 600 operates significantly faster than encoder software 500. This asymmetry in processing rates between encoding (compression) and decoding (decompression) is typically true of all compression algorithms. Because the decoder software operates faster than the encoder software, running the decoder software on server 120 that also runs the application 102 that requested the data via a GET API call to a compressed storage service, it will be possible to run multiple decode software threads on server 120, in a manner that matches the "wire speed" of network connection 145. For example, if network connection 145 in FIG. 6 operates at 10 Gbps (which corresponds to 1.25 GB/sec), four software decoding threads will match that "wire speed", because if each decode thread operates at 300 MB/sec (as shown in FIG. 6c), four threads×300 MB/sec/thread=1.2 GB/sec. Using hyperthreading (2 software threads per core) means that server 120a must only allocate 2 cores (4 threads) to maintain a "wire speed" of 10 Gbps.

Figure 7A:
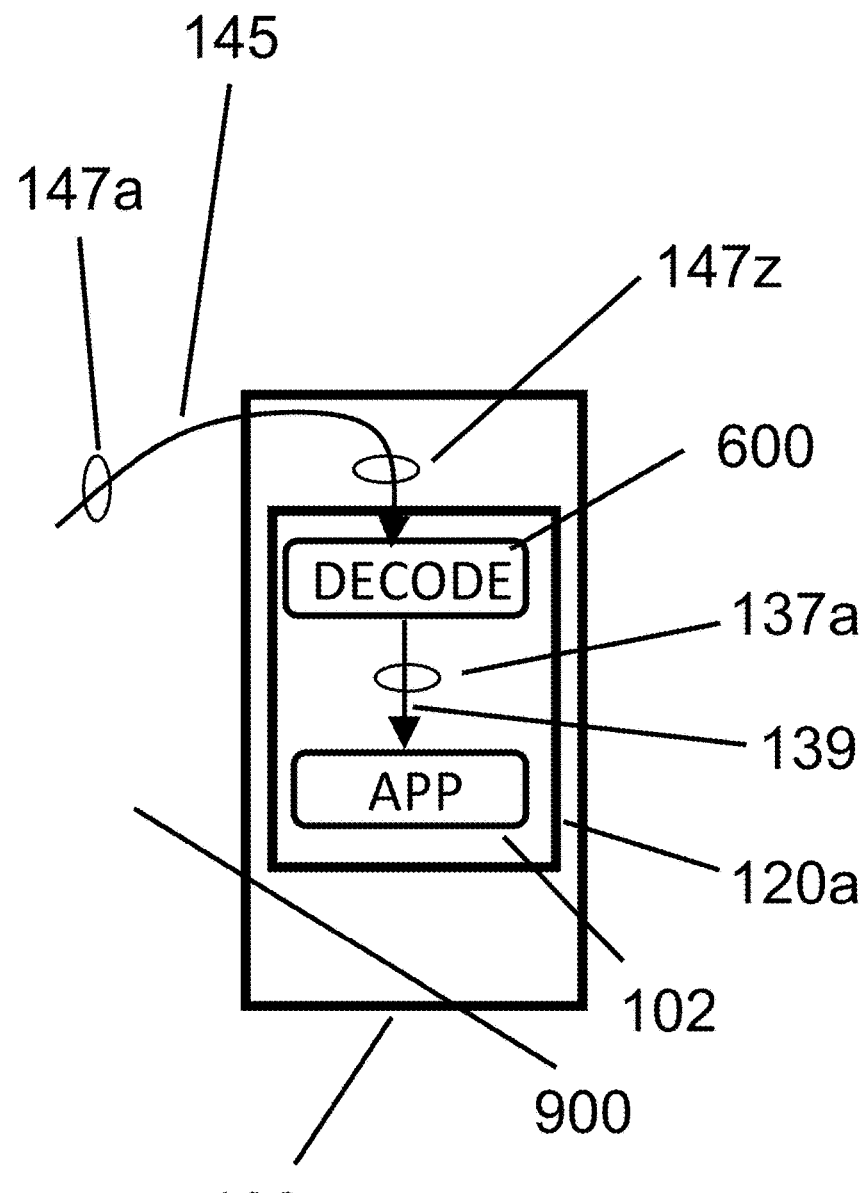
FIG. 7a illustrates decoding performed in the same server as the application requesting the data.

FIG. 7a illustrates decoder software 600 running in the same server 120a that runs application 102. In this configuration, data transfer link 139 may be simply a shared buffer in Dynamic Random Access Memory (DRAM) within Server 120a. Decoder processing in FIG. 7a is in all other respects identical to the processing described in FIG. 6.

Figure 7B:
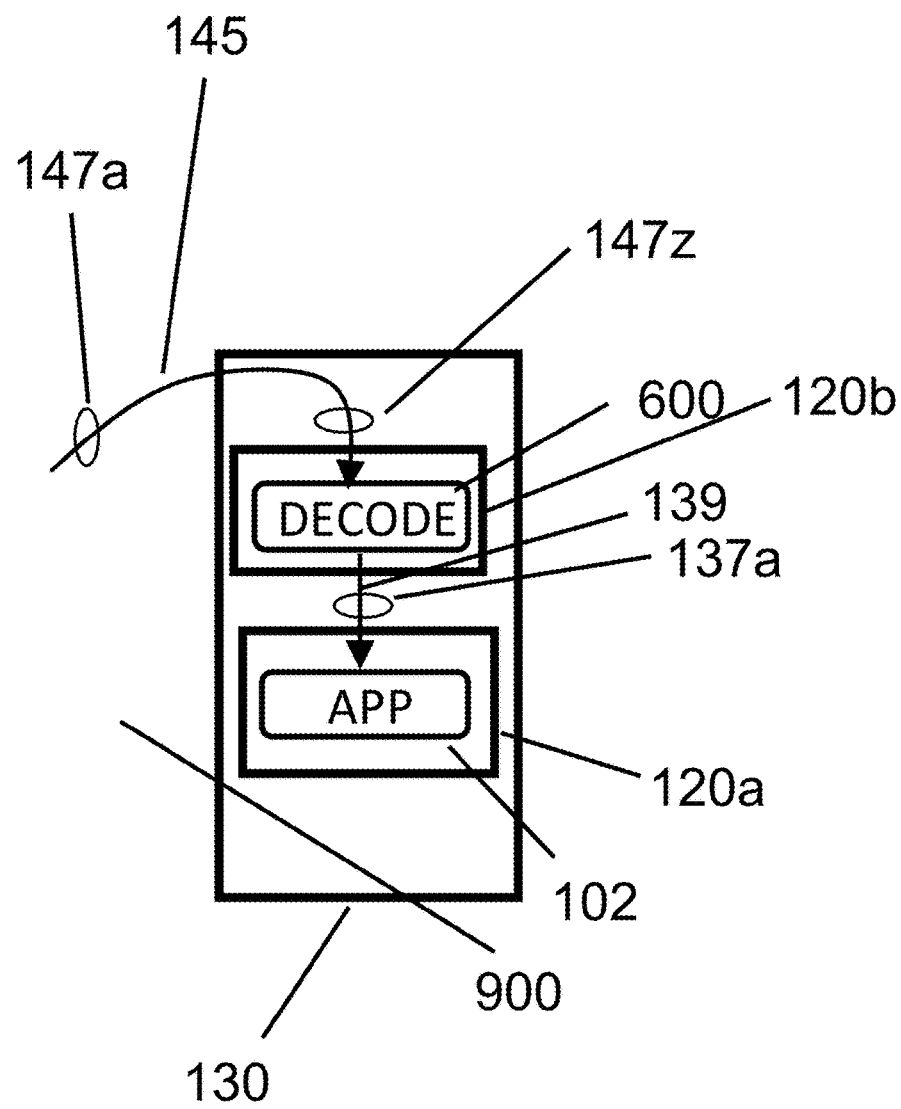
FIG. 7b illustrates decoding performed in a different server than where the application requesting the data runs.
Figure 8:
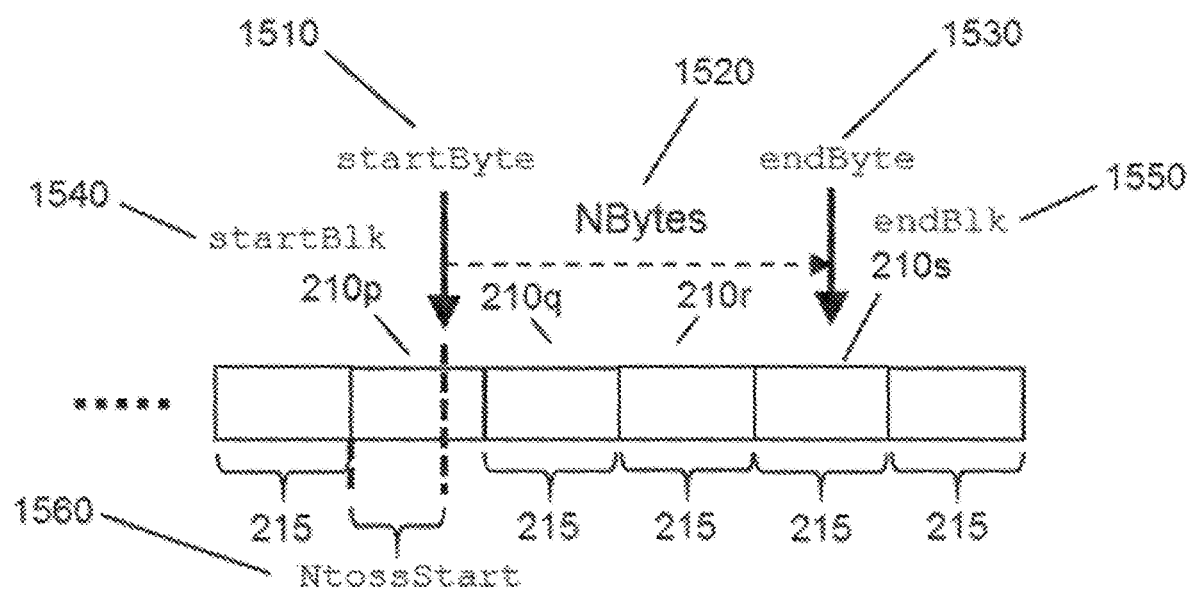
FIG. 8 illustrates how a user-specified {startByte 1510, NBytes 1520} random access specifier is converted into three random-access parameters {startBlk 1540, endBlock 1550, and NtossStart 1560}.

FIG. 7b illustrates decoder software 600 running in sever 120b, a server that differs from the server 120a that runs application 102. In this example, data transfer link 139 may be an Ethernet link, a shared Peripheral Component Interface Express (PCIe) link, or other data transfer mechanism that supports data exchange between servers located in the same server rack 130. Decoder processing in FIG. 7b is in all other respects identical to the processing described in FIG. 6.

To summarize, FIG. 7a illustrates decoder software 600 running in the same server as application 102. In contrast, FIG. 7b illustrates decoder software 600 running in a different server (server 102b) than application 102, which runs in server 102a.

Those skilled in the art of data center architecture will note that most data center servers 120 in server racks 130 are connected today (2019) to the TOR switches 140 via 10 Gbps or slower networking links. Thus the innovation described in this specification, being software-based, can scale as network links between servers and TO R switches get faster. For example, as data center servers 120 are connected someday to TOR switches 140 via 25 Gbps (~3 GB/sec) or 40 Gbps (~5 GB/sec) network connections, server 120*a* running application software 102 can simply allocate more cores or threads to decoder software 600. To maintain ~3 GB/sec (25 Gbps) decoding will require ~10 threads (~5 hyper-threaded cores), while to maintain ~5 GB/sec (50 Gbps) decoding will require ~16 threads (~8 hyper-threaded cores). Thus the present innovation is scalable to match future, faster network connections from TOR switch 140 to server 120 that runs decoder software 600.

Those skilled in the art of data center architecture will also appreciate that encoder software 500 and decoder software 600 could also be implemented in other processors, such as Graphical Processing Units (GPUs) offered by Nvidia and AMD, or Field-Programmable Gate Arrays (FPGAs) offered by Xilinx and Intel (formerly called Altera, then called the Intel Programmable Systems Group), without deviating from the spirit and intent of the present innovation.

The location of decoding can substantially improve data center performance. All or most storage can be in compressed form, in whatever way compressed data gets put into storage. Once all data is in compressed form, the focus becomes where decompression occurs. So the transfer of encoded data can occur across the "long links" network connections from storage (where the data is already stored in compressed form) to the app that requested the data (or a subset of the data). The decompression can be done in software, in the rack that houses the IT application that originally requested the data. That way the decompressed data that was requested by the IT application is transferred across "short links". The "long links" are typically between top-of-rack (TOR) switches, from the TOR switch in the data storage rack to the TOR switch in the server rack where the IT application is running.

The short links could be in shared memory. The "long links" (typically Ethernet links between top-of-rack switches from storage racks to server racks) carry compressed data, while the "short links" carry uncompressed data.

Included herein are copies of my prior Patent Applications, including, describing examples of encoding and decoding technologies suitable for use in the configurations described herein.

What is claimed is:

1. A method for managing data flow in a network including a plurality of network nodes, wherein the network includes an inter-rack network, and a plurality of racks having intra-rack networks, and wherein a given rack in the plurality of racks includes a rack switch and one or more other network nodes on the intra-rack network of the given rack, comprising:

storing a plurality of compressed files or objects in data storage at a first network node in the network, wherein a compressed file or object in the plurality of compressed files or objects includes a plurality of compressed blocks;

receiving at a storage access manager at a second network node in the network, a message from an application instance at a third network node located on the intra-rack network of the given rack, the message requesting access to a segment of a selected file or object in uncompressed form, wherein the requested segment is a subset of the selected file or object, not including all of the selected file or object;

generating at the storage access manager in response to the message, and sending a request to transfer through a network route to the application instance at the third network node, one or more compressed blocks of the compressed file or object that encode the requested segment of the selected file, the one or more compressed blocks not including all of the plurality of compressed blocks, and wherein the network route includes a decompression module executed in the network capable of decompressing the one or more compressed blocks to recover the requested segment in uncompressed form, and of forwarding the requested segment in uncompressed form to the application instance at the third network node;

wherein the network route includes a fourth network node between the second node and the third node, and the fourth network node includes the executable decompression module and decompresses the compressed data, the fourth network node located on the intra-rack network of the given rack.

2. The method of claim 1, wherein the network connecting the second and the third nodes is the Internet.

3. The method of claim 1, wherein the segment is identified by an offset from a beginning of the file and a length of the segment in uncompressed form, and the offset includes a byte offset, and the length includes a number of bytes.

4. A computer program product, comprising:

non-transitory memory storing computer program instructions executable at a first network node, the computer program instructions configured to execute a method for managing data flow in a network including a plurality of network nodes, in which a plurality of compressed files or objects are stored in data storage a first network node in the network, wherein a compressed file or object in the plurality of compressed files or objects includes a plurality of compressed blocks, and wherein the network includes an inter-rack network, and a plurality of racks having intra-rack networks, and wherein a given rack in the plurality of racks includes a rack switch and one or more other network nodes on the intra-rack network of the given rack; the method including receiving at a second network node in the network, a message from an application instance at a third network node, the message requesting access to a segment of a selected file or object in uncompressed form, wherein the requested segment is a subset of the selected file or object, not including all of the selected file or object;

generating in response to the message, and sending a request to transfer through a network route to the application instance at the third network node located on the intra-rack network of the given rack, one or more compressed blocks of the compressed file or object that encode the requested segment of the selected file, the one or more compressed blocks not including all of the plurality of compressed blocks, and wherein the network route includes a decompression module executed in the network capable of decompressing the one or more compressed blocks to recover the requested segment in uncompressed form, and of forwarding the requested segment in uncompressed form to the application instance at the third network node, wherein the network route includes a fourth network node between the second node and the third node, and the fourth network node includes the executable decompression module and decompresses the compressed data, the fourth network node located on the intra-rack network of the given rack.

5. The computer program product of claim 4, wherein the plurality of compressed blocks of a compressed file or object includes a first block, and wherein the one or more compressed blocks do not include the first block of the plurality of compressed blocks of the compressed file or object.

6. The computer program product of claim 4, wherein the network connecting the second and the third nodes is the Internet.

7. The computer program product of claim 4, wherein the segment is identified by an offset from a beginning of the requested file or object in uncompressed form and a length, and the offset includes a byte offset, and the length includes a number of bytes.

8. A computing system, comprising:
a plurality of network nodes configured for communications via a network, a first network node in the plurality of network nodes having access to storage resources storing a plurality of compressed files or objects in data storage, wherein a compressed file or object in the plurality of compressed files or objects includes a plurality of compressed blocks, and wherein the network includes an inter-rack network, and a plurality of racks having intra-rack networks, and wherein a given rack in the plurality of racks includes a rack switch and one or more other network nodes on the intra-rack network of the given rack;
a storage access manager at a second network node in the plurality of network nodes configured to receive a message from an application instance at a third network node in the plurality of network nodes located on the intra-rack network of the given rack, the message requesting access to a segment of a selected file or object in uncompressed form, wherein the requested segment is a subset of the selected file or object, not including all of the selected file or object;
the storage access manager including logic to send a request to the storage resources at the first network node, in response to the message, to transfer through a network route to the application instance at the third network node, one or more compressed blocks of a compressed file or object in the storage resources that encode the requested segment of the selected file, the one or more compressed blocks not including all of the plurality of compressed blocks;
wherein the network route includes a fourth network node between the second node and the third node, and the fourth network node includes a decompression module executable in the network to decompress the one or more compressed blocks to recover the requested segment in uncompressed form, and of forwarding the requested segment in uncompressed form to the application instance at the third network node, the fourth network node located on the intra-rack network of the given rack.

9. The computing system of claim 8, wherein the second network node and the third network node are each one of the one or more other network nodes on the given rack.

10. The computing system of claim 8, wherein the plurality of compressed blocks of a compressed file or object includes a starting block, and wherein the one or more compressed blocks do not include a starting block of the plurality of compressed blocks of the compressed file or object.

11. The computing system of claim 8, wherein the network connecting the second and the third nodes is the Internet.

12. The computing system of claim 8, wherein the segment is identified by an offset from a beginning of the file in uncompressed form and a length.

13. The computing system of claim 12, wherein the offset includes a byte offset, and the length includes a number of bytes.

14. A method for managing data flow in a network including a plurality of network nodes which stores a plurality of compressed blocks in data storage at a first network node in the network, wherein at least some files or objects in the data storage are encoded by more than one compressed block in the plurality of compressed blocks, the method comprising:
receiving at a second network node in the network, a first message from an application instance at a third network node in the network, the first message including an identifier of a portion of selected file or object in the data storage and an identifier of a buffer accessible at the third network node to which the selected file or object is to be stored;
generating at the second network node in response to the first message, and sending a second message to the first network node, the second message including an identifier of a compressed block or blocks in the plurality of compressed blocks in which the portion of the selected file or object is encoded and an identifier of a buffer of a decompression module in the network for the compressed block or blocks accessible by the decompression module; and
decompressing the compressed block or blocks at the decompression module, and transferring the portion of the selected file or object in decompressed form to the buffer accessible at the third network node identified in the first message.

15. The method of claim 14, wherein the decompression module is on a fourth network node in the network.

16. The method of claim 15, wherein the network includes an inter-rack network, and a plurality of racks having intra-rack networks, and wherein a given rack in the plurality of racks includes a rack switch and one or more other network nodes on the intra-rack network of the given rack, and wherein the third and fourth network nodes are on the intra-rack network.

17. The method of claim 14, wherein the messages comprise API calls.

18. The method of claim 14, wherein a microservices manager at the second network node receives the first message, and generates and sends the second message.

* * * * *